May 9, 1944.  L. C. OAK ET AL  2,348,262

CUTTING TOOL

Filed Sept. 7, 1942

Inventors
Lawrence C. Oak &
James B. Donnelly.

By Blackmore, Spencer & Hunt
Attorneys

Patented May 9, 1944

2,348,262

UNITED STATES PATENT OFFICE 2,348,262

CUTTING TOOL

Lawrence C. Oak, Huntington Woods, and James B. Donnelly, Detroit, Mich., assignors to Ternstedt Manufacturing Company, Detroit, Mich., a corporation of Michigan Application September 7, 1942, Serial No. 457,594

7 Claims. (Cl. 29—95)

The invention relates to cutting tools and especially to tools of the kind used in lathes for turning.

In the past such tools have consisted of a piece of steel of suitable dimensions with its tip ground to provide a cutting edge of the desired contour and adapted to be held in the tool post of a lathe, planer, or other machine. As the cutting edges of such tools become worn or are otherwise destroyed, they are renewed by re-grinding the tip and this process can be repeated as often as necessary so long as the length of stock remaining in the tool is sufficient.

More recently, materials such as tungsten carbide which will maintain a cutting edge for a longer time than ordinary steel have been discovered, but since these materials are much more expensive than ordinary steel it has been the practice to cement, braze or weld a bit of the material in a suitably formed recess at the tip of a piece of ordinary steel forming the tool shank and grind the tipped end of said shank to provide the cutting edge in the tip of more durable material.

However, when the tool thus formed has been re-ground several times and the more durable material and part of the shank of ordinary steel has been thus expended, the remaining portion of the shank has been discarded as useless—a practice which is extremely wasteful.

The object of the invention is a tool shank provided with a bit which is suitably secured as by welding or brazing to a backing piece which is adjustable, detachable and renewable on a tool shank which may be used indefinitely.

The above and other objects of the invention will be apparent as the description proceeds.

In the drawing

Figure 1:
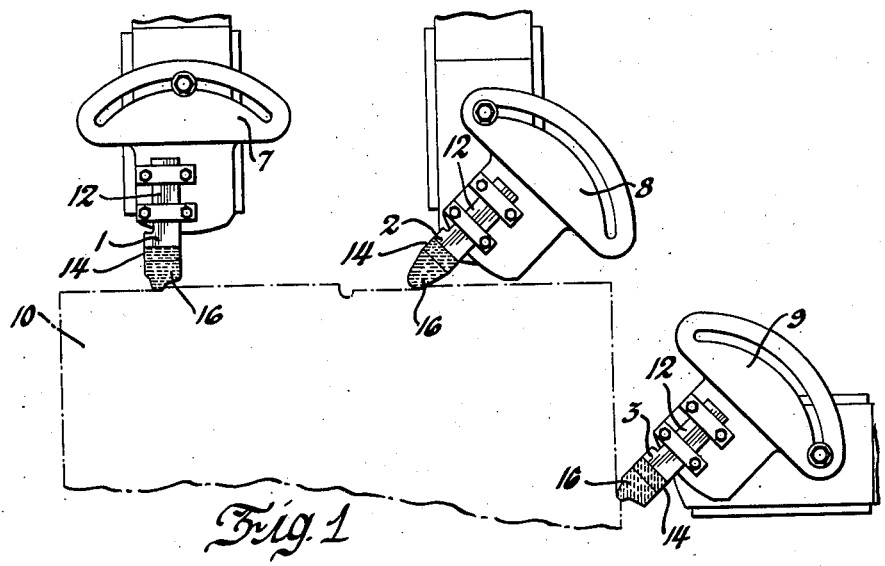
Figure 1 shows tools according to the invention in tool posts adjusted to perform different cutting operations on a work piece.
Figure 2:
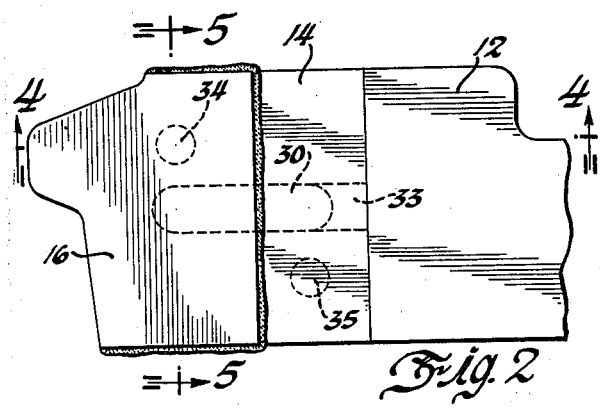
Figure 2 is an enlarged plan view of an end of one of the tools shown in Figure 1.
Figure 3:
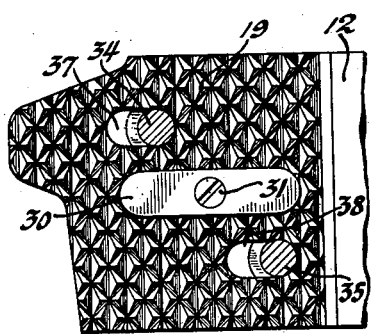
Figure 3 is a plan view of the end of the tool shank with the bit and backing piece assembly removed.

The tools 1, 2, and 3 of Figure 1 are identical, except that the cutting edge of the tool 2 is ground to a different shape than the tools 1 and 3. They are mounted in identical tool posts 7, 8, and 9 which are adjustable as shown to perform the various indicated cutting operations on a work piece 10.

Referring now more particularly to Figures 2–5, each of the tools of Figure 1 comprises a shank portion 12, and a backing piece 14 with a bit 16 of more durable material than the backing piece 14 or the shank 12. The bit 16 is welded, brazed, or otherwise rigidly secured in a recessed part 17 of the backing piece 14 which in turn seats on a recessed part 19 of the shank 12.

Figure 4:
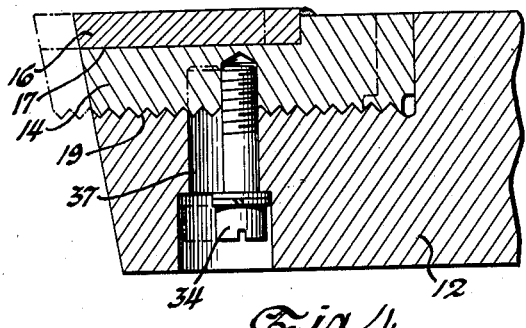
Figure 4 is a sectional view of line 4—4 of Figure 2.
Figure 5:
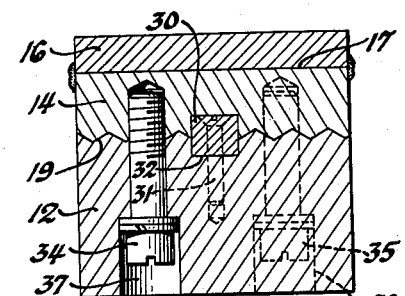
Figure 5 is a sectional view on line 5—5 of Figure 2.

The surface of the recessed part 19 of the shank 12 is provided with regularly spaced serrations in three directions; transversely as shown in Figure 4 and as indicated by the broken lines in the tool 1 of Figure 1, and diagonally as respectively indicated by the broken lines in the tools 2 and 3 of Figure 1. Together the serrations in these different directions form the pattern shown in Figure 3. The bottom surface of the backing piece 14 is similarly serrated to match the serrated surface on the shank 12, and when these parts are clamped together with the serrations in interengaging relationship, a thrust in any direction which might otherwise cause relative sliding displacement thereof is effectively resisted by the surfaces of the serrations.

A key 30 secured by a screw 31 in a slot 32 in the recessed part 19 of the shank 12 engages a longitudinal groove 33 in the bottom surface of the backing piece 14 and prevents other than longitudinal adjusting movement thereof relatively to the shank 12 in steps equal to one or more times the pitch of the interengaging serrations.

The backing piece 14 with its bit 16 is rigidly clamped and secured to the shank 12, in the desired position of longitudinal adjustment by set screws 34 and 35 which extend through longitudinally slotted or otherwise elongated and countersunk holes 37 and 38 in the shank 12, into tapped holes in the backing piece. The maximum extent of adjustment thus provided is limited by the length of the elongated holes 37 and 38, and as shown in Figure 4 is from the position shown in full lines to the position shown in dotted lines therein.

A tool according to the invention has the following advantages: There is economy of steel because only one shank per operation per machine, need be provided, and it lasts indefinitely. There is a saving of heat in brazing the bit to the backing piece since the latter is a much smaller piece to be heated than a whole shank. Since only the cutting bit and backing piece has to be ground there is a saving of material and grinding time. Because only the cutting bit and backing piece has to be renewed, the inventory is reduced and the requisite storage space is lessened.

We claim:

1. In a cutting tool, a cutting bit permanently secured to a backing piece, a shank, and means whereby said backing piece is removably and adjustably secured to said shank, in which said means include a tapped hole in said backing piece, a shank, a hole in said shank, and a set screw extending through said hole in said shank into said tapped hole in the backing piece for securing said parts together, there being clearance between said set screw and the wall of the hole in the shank to permit adjustment in the position of said cutting bit and backing piece relatively to the shank.

2. In a cutting tool, a cutting bit, a backing piece therefor, said cutting bit being rigidly secured to said backing piece, a tapped hole in said backing piece, a shank, a hole in said shank, a set screw extending through said hole in said shank into said tapped hole in the backing piece for securing said parts together, there being clearance between said set screw and the wall of the hole in the shank to permit adjustment in the position of said cutting bit and backing piece relatively to the shank, and means additional to said set screw for preventing undesired relative displacement of said parts.

3. The combination according to claim 2 in which said means consist of matching serrations on the engaging surfaces of said backing piece and shank.

4. The combination according to claim 2 in which said means consist of intengaging multi-directional serrations on the engaging surfaces of said backing piece and shank to prevent undesired relative displacement thereof in any direction.

5. The combination according to claim 2 in which the hole in said shank is longitudinally elongated to permit adjustment of said cutting bit and backing piece longitudinally of the shank.

6. The combination according to claim 2 in which the hole in said shank is longitudinally elongated to permit adjustment of said cutting bit and backing piece longitudinally of the shank, and a longitudinally disposed key between said parts prevents relative displacement of said parts in any other direction.

7. In a cutting tool, a cutting bit, a backing piece with a recessed part, said cutting bit being permanently secured in the recessed part of said backing piece, a tool shank, a recessed part in said tool shank to accommodate said cutting bit and backing piece, a tapped hole in said backing piece, a longitudinally elongated hole in said shank, a set screw extending through said longitudinally elongated hole in said shank and into the said tapped hole in the backing piece for securing said parts together in different positions of relative longitudinal adjustment, and means additional to said set screw for preventing undesired relative longitudinal displacement of said backing piece and shank comprising interengaging transverse serrations in the bottom surface of said backing piece and the bottom of the recess in the shank.

LAWRENCE C. OAK.
JAMES B. DONNELLY.